3,342,691
GAS-COOLED, GRAPHITE-MODERATED
NUCLEAR REACTOR
Philip Cloudesley Warner, Wimbledon, London, and John Charles Bennett, Northfleet, Kent, England, assignors to United Power Company Limited, London, England, a British company
Filed Aug. 26, 1965, Ser. No. 482,849
Claims priority, application Great Britain, Sept. 8, 1964, 36,760/64
6 Claims. (Cl. 176—60)

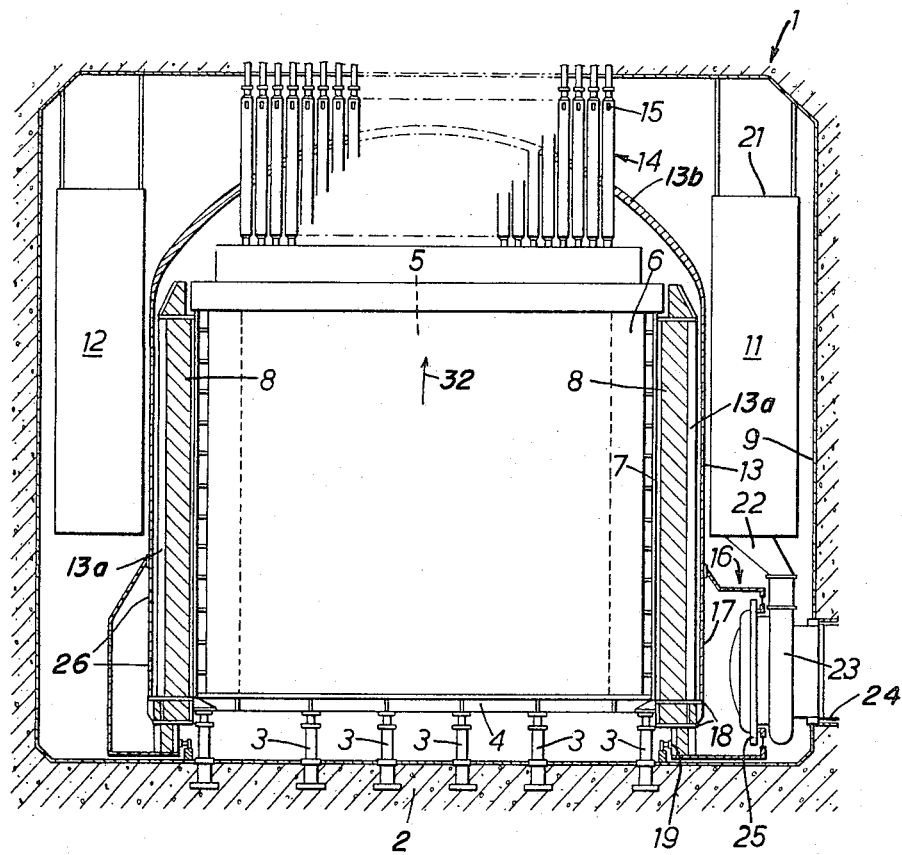

This invention relates to nuclear reactors and has particular reference to nuclear reactors of the gas-cooled, graphite moderated type housed in concrete pressure vessels.

In such reactors it has been proposed to employ a so-called hot box to receive hot gases emerging from the core and duct them to heat exchangers in such a way that the pressure-containing-lining of the concrete pressure vessel is not subjected to the high temperature of the emerging gases. In reactors in which the heat exchangers are contained within the pressure vessel, certain problems arise if the hot box construction is adopted, for example, expansion of hot box and associated structures has to be accommodated and, in addition, an increase in the head room above the core is required to receive the hot box and must be sufficient to allow radial deflection between the top of the hot box and the underside of the pressure vessel of an order sufficient to permit fuel handling through the charge tubes which normally pass through the hot box.

It is an object of the present invention to provide a nuclear reactor in which the flow of coolant gas from the core is contained in a manner which does not give rise to the problems discussed above.

According to the present invention the core of a nuclear reactor is contained in a gas-tight enclosure apertured to permit passage through the enclosure of hot coolant gas from the core and the return to the core of such gas after cooling.

Preferably, the enclosure is in the form of a domed cylindrical enclosure which is sealed to the floor of the pressure vessel in gas-tight manner.

In one embodiment of the invention, the weight of the enclosure is taken by the support grid on which the core of the reactor rests.

Desirably, the enclosure is thermally insulated on its outside i.e. on its external surface to an extent which corresponds with the internal gas temperature. Thus, the domed head of the enclosure is more heavily insulated than the lower end of the enclosure. In that manner, a substantially constant temperature obtains throughout the wall of the enclosure and thermal stresses in the latter are minimised.

Heat exchangers located within the pressure vessel receive the hot coolant gas, circulation through the heat exchangers being maintained by coolant circulating pumps, of which several are normally fitted. Each heat exchanger may have its own pump which is located at the coolant gas outlet of the heat exchanger.

Preferably, the coolant pumps are mounted in such manner that each can be withdrawn for servicing or other purposes. The pumps are so located that they are not exposed to radio-active radiation and each has an inlet port communicating with the heat exchanger and an outlet port communicating with the interior of the enclosure. In addition there is provided for each pump a sleeve or like valve which is operable to close both inlet and outlet ports simultaneously prior to withdrawal of the motor. The sleeve valve comprises a movable tubular structure part of which closes the inlet port while another part closes the outlet port.

By way of example only, an embodiment of the invention will now be described in greater detail with reference to the accompanying drawing which shows the embodiment in diagrammatic cross-section only.

The drawing shows part of a reinforced concrete pressure vessel 1 in the floor 2 of which is mounted a series of grid columns 3 and rollers which carry the support grid 4 of a graphite block core 5 formed with the usual vertical channels to receive fuel elements, moderator rods, instruments or other components. The core is surrounded by a reflector structure 6 and is supported by a tie-bar assembly indicated diagrammatically at 7. Round the tie-bar assembly 7 is disposed the usual shield structure 8.

The inside surface of the pressure vessel 1 is covered with a pressure containing lining 9 in turn covered with a layer of thermal insulation whose thickness may be greatest in the upper region of the inside surface. The dimensions of the interior of the pressure vessel are such that sufficient space is provided to accommodate heat exchangers of which two, 11 and 12 are shown in the drawing.

Four such heat exchangers are fitted and are spaced equally around the shield structure 8 from which they are separated by a domed, gas-tight enclosure 13 which, as can be seen from the drawing, encloses the core 5, side reflectors 6, tie members 7 and shield structure 8, the enclosure being spaced from the shield structure 8 by an annular channel 13a. The domed upper end of the enclosure 13 is of increased wall thickness as compared with the vertical wall and is apertured to permit the passage of charge tubes 14 which pass upwardly through the wall of the concrete pressure 1 and terminate on the charge floor of the reactor in the usual way. Each charge tube is apertured as at 15 adjacent its point of entry into the wall of the pressure vessel.

Adjacent its lower end, the enclosure 13 is formed with an external jacket 16 while the lower part 17 rests on an extension 18 of the grid 4. At its extreme lower end, the enclosure 13 is sealed in gas-tight fashion to the lining 9 by means of flexible seals indicated diagrammatically at 19. External thermally insulation 13b surrounds at least the upper part of the enclosure, the thickness of the insulation decreasing with increasing distance from the domed end of the enclosure. Such decrease ensures a substantially constant temperature in the wall of the enclosure and thus, thermal stresses in the latter are minimised.

Each heat exchanger is contained in a housing open at its upper end 21 whilst its lower end is joined to ducting 22 connected to a circumferential inlet port formed in a housing 23 accommodating a coolant circulating pump. The housing is located in an opening in the jacket 16 to which the housing is sealed and from which the housing extends through the wall of the pressure vessel as indicated at 24. The housing 23 has a circumferential outlet port 25 which communicates with apertures 26 in the lower part 17 of the enclosure 13 spaced circumferentially from the housing 23 thereby minimising the possibility of direct irradiation of the housing and circulating pump. The inlet and outlet ports in the housing 23 are controlled by a single sleeve valve which surrounds the circulating pump and is connected to an operating mechanism for moving the sleeve axially to open and shut the inlet and outlet ports.

The coolant pumps combine to produce a flow of coolant gas upwardly through the annular channel 13a and then through the core 5 leaving the latter upwardly as indicated by the arrow 32 into the charge tubes 14, through the apertures 15 in the latter, into the space between the enclosure 13 and the lining 9 and thence downwardly through the heat exchangers to the circulating pumps.

Cooled coolant gas leaves the pumps via outlet port 25 and from each pump the flow enters the enclosure 13 via the apertures 26 and then passes upwardly through the core along the flow path described above.

The enclosure is constructed from metal plates and is thus of comparatively simple construction. The enclosure is self-centring and self-locating and requires the minimum of head room above the core to receive the domed end. The curvature of the domed end ensuring increasing lengths of charge tubes from the centre outwards minimises the effects of differential radial movements between the top of the pressure vessel and the dome due to thermal expansion. Since the enclosure is secured to the core grid support, the combined weights of core and enclosures are available to resist upward coolant gas pressures which result from the containment by the enclosure of the coolant gas. The holes in the domed end of the enclosure are drilled after that end has been built and this enables the requisite close tolerances in the positioning of the holes to be achieved. Moreover reasonable space is available inside the enclosure to enable operations and weld the charge tubes in place after they have been positioned in the holes. It will be understood that the tubes in the centre of the domed end are filled and fixed first and fitting of tubes then proceeds outwardly from the centre.

The enclosure also forms a housing for the core whilst the centre is being constructed and can be adapted to provide the necessary "clean conditions" for the construction, separating the core construction area from the surrounding "dirty" areas.

No ducting is required to convey the coolant gas to the heat exchanges and thus problems arising from thermal expansion of the ducting are eliminated.

We claim:

1. A gas-cooled, graphite-moderated nuclear reactor comprising in combination a pressure vessel, a nuclear core inside said vessel, a gas-tight enclosure inside said vessel, said enclosure housing said core and spaced therefrom by a flow path for coolant, said housing also being spaced from said vessel, a plurality of heat exchangers located outside said enclosure and inside said vessel, a plurality of charge tubes passing into said enclosure from outside said pressure vessel to permit movement of nuclear fuel to and from said core, apertures in the walls of said tubes, said apertures being located externally of said enclosure but within said vessel, and, coolant circulators for circulating gaseous coolant from said apertures in said charge tubes, through said heat exchangers into said enclosure, through said flow path and said core into said charge tubes.

2. A gas-cooled, graphite-moderated nuclear reactor comprising in combination a concrete pressure vessel, a gas-impervious internal lining on said vessel, a nuclear core inside said vessel, an enclosure open at one end positioned inside said vessel, said enclosure housing said core and being spaced therefrom by a flow path for coolant, said housing also being spaced from said concrete pressure vessel, gas-tight seals securing said open end of said gas-tight enclosure to said internal lining, a plurality of heat exchangers located outside said enclosure and inside said vessel, a plurality of charge tubes passing into said enclosure from outside said pressure vessel to permit movement of nuclear fuel to and from said core, apertures in the walls of said tubes, said apertures being located externally of said enclosure but within said vessel, and, coolant circulators for circulating gaseous coolant from said apertures in said charge tubes, through said heat exchangers into said enclosure, through said flow path and said core into said change tubes.

3. A gas-cooled, graphite-moderated nuclear reactor comprising in combination a pressure vessel, a floor within said vessel, a support grid mounted upon said floor, a nuclear core positioned on said support grid, an enclosure open at one end positioned inside said vessel, said enclosure housing said support grid and said nuclear core, a coolant flow path between said enclosure and said core, said enclosure also being spaced from said pressure vessel, gas-tight seals securing said open end of said enclosure to said floor, a plurality of heat exchangers located outside said enclosure and inside said vessel, a plurality of charge tubes passing into said enclosure from outside said pressure vessel to permit movement of nuclear fuel to and from said core, apertures in the walls of said tubes, said apertures being located externally of said enclosure but within said vessel, and, coolant circulators for circulating gaseous coolant from said apertures in said charge tubes, through said heat exchangers into said enclosure, through said flow path and said core into said charge tubes.

4. A gas-cooled, graphite-moderated nuclear reactor as claimed in claim 1 and further comprising an external jacket fitted to said enclosure, mountings in said jacket for said coolant circulators, said jacket receiving the coolant output of said circulators before the output passes into said enclosure.

5. A gas-cooled, graphite-moderated nuclear reactor as claimed in claim 3 and further comprising an extension on said support grid for receiving the open end of said enclosure, an external jacket secured to said enclosure adjacent the open end thereof, gas-tight seals joining said jacket to said flow, mountings for said circulators in said jacket, said jacket receiving the coolant output of said circulator before the output passes into said enclosure.

6. A gas-cooled, graphite-moderated nuclear reactor as claimed in claim 5 and further comprising apertures in said enclosure adjacent said jacket to permit passage of coolant from said jacket into said enclosure, said apertures being offset circumferentially with respect to said coolant circulators.

References Cited

UNITED STATES PATENTS

| | | | |
|---|---|---|---|
| 3,008,891 | 11/1961 | Knights et al. | 176—59 X |
| 3,105,805 | 10/1963 | Rodwell | 176—60 X |
| 3,149,046 | 9/1964 | Boyd | 176—60 X |
| 3,159,549 | 12/1964 | Moore et al. | 176—60 X |
| 3,170,846 | 2/1965 | Blumberg | 176—59 |
| 3,227,620 | 1/1966 | Cutts et al. | 176—59 X |

FOREIGN PATENTS

| | | |
|---|---|---|
| 866,037 | 4/1961 | Great Britain. |

REUBEN EPSTEIN, *Primary Examiner.*